(12) United States Patent
Albrecht et al.

(10) Patent No.: US 8,052,956 B2
(45) Date of Patent: Nov. 8, 2011

(54) TUNGSTIC ACID POWDER CONSISTING OF SPHERICAL TUNGSTEN PARTICLES AND METHOD FOR PRODUCING SAME

(75) Inventors: Sven Albrecht, Goslar (DE); Armin Olbrich, Seesen (DE); Michael Reiss, Bad Harzburg (DE); Frank Schrumpf, Goslar (DE); Juliane Meese-Marktscheffel, Goslar (DE); Uwe Kutzler, Bad Harzburg (DE)

(73) Assignee: H. C. Starck GmbH (DE)

( * ) Notice: Subject to any disclaimer, the term of this patent is extended or adjusted under 35 U.S.C. 154(b) by 485 days.

(21) Appl. No.: 11/579,775

(22) PCT Filed: Apr. 28, 2005

(86) PCT No.: PCT/EP2005/004550
§ 371 (c)(1),
(2), (4) Date: Jan. 30, 2007

(87) PCT Pub. No.: WO2005/110923
PCT Pub. Date: Nov. 24, 2005

(65) Prior Publication Data
US 2007/0224096 A1   Sep. 27, 2007

(30) Foreign Application Priority Data
May 11, 2004   (DE) .......................... 10 2004 023 068

(51) Int. Cl.
*C01G 39/00* (2006.01)
*C01G 41/00* (2006.01)
(52) U.S. Cl. ....................................................... 423/606
(58) Field of Classification Search .................... 423/606
See application file for complete search history.

(56) References Cited

U.S. PATENT DOCUMENTS

| | | | | |
|---|---|---|---|---|
| 1,683,695 A | * | 9/1928 | Patrick et al. | 423/606 |
| 1,972,136 A | * | 9/1934 | Driggs | 423/606 |
| 2,316,583 A | * | 4/1943 | Highriter et al. | 423/55 |
| 2,366,250 A | * | 1/1945 | Foulke et al. | 423/606 |
| 2,368,580 A | * | 1/1945 | Stein et al. | 423/55 |
| 2,968,527 A | * | 1/1961 | Baker | 423/54 |
| 2,993,755 A | * | 7/1961 | Redanz | 423/606 |
| 3,193,347 A | * | 7/1965 | Forward et al. | 423/54 |

(Continued)

FOREIGN PATENT DOCUMENTS

DE   15 92 472   12/1970

(Continued)

OTHER PUBLICATIONS

Patnaik, Pradyot (2003). Handbook of Inorganic Chemicals. (pp. 954-955). McGraw-Hill. Online version available at: http://knovel.com/web/portal/browse/display?_EXT_KNOVEL_DISPLAY_bookid=688&VerticalID=0.*

(Continued)

*Primary Examiner* — Stanley Silverman
*Assistant Examiner* — Anthony J Zimmer
(74) *Attorney, Agent, or Firm* — Connolly Bove Lodge & Hutz LLP

(57) ABSTRACT

Process for the production of a powdered spherical tungstic acid by acidification of an aqueous alkaline tungstate solution with mineral acid at elevated temperature, preferably in a continuous stirred tank or a cascade of at least 2 continuous stirred tanks, and tungstic acid obtainable in this way, which is characterized by a high bulk density and spherical morphology.

12 Claims, 2 Drawing Sheets

U.S. PATENT DOCUMENTS

Figure 1:
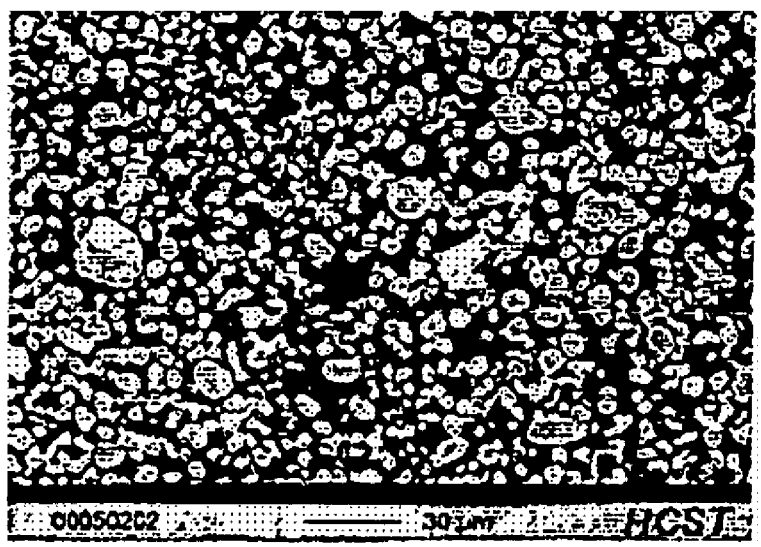

| | | | |
|---|---|---|---|
| 3,495,954 A * | 2/1970 | Grimes et al. | 423/252 |
| 3,826,755 A * | 7/1974 | Grimes et al. | 252/635 |
| 4,080,420 A * | 3/1978 | Kasserra et al. | 423/55 |
| 4,080,421 A * | 3/1978 | Kasserra | 423/61 |
| 4,083,920 A * | 4/1978 | Beaton et al. | 75/420 |
| 4,083,922 A * | 4/1978 | Kasserra | 423/56 |
| 4,339,424 A * | 7/1982 | Jacobson et al. | 423/606 |
| 4,629,503 A * | 12/1986 | Fruchter et al. | 75/420 |
| 4,675,167 A | 6/1987 | Shinoda et al. | |
| 2004/0214731 A1 | 10/2004 | Tynik | |

FOREIGN PATENT DOCUMENTS

| | | |
|---|---|---|
| DE | 148 522 | 5/1981 |
| EP | 0 219 787 | 4/1987 |
| GB | 1083957 | 9/1967 |

OTHER PUBLICATIONS

Kumagai, N. et al., "Preparation and Characterization of Tungstic Acid C Phases Containing Various Cations", Solid State Ionics 53-56 (1992), pp. 324-332.

* cited by examiner

TUNGSTIC ACID POWDER CONSISTING OF SPHERICAL TUNGSTEN PARTICLES AND METHOD FOR PRODUCING SAME

RELATED APPLICATIONS

This application is a national stage application (under 35 U.S.C. 371) of PCT/EP2005/004550 filed Apr. 28, 2005, which claims benefit of German application 10 2004 023 068.4 filed May 11, 2004.

The invention concerns a process for the production of tungstic acid $H_2WO_4$, tungstic acid obtainable in this way having a high bulk density and its use for the production of tungsten metal powder.

Tungsten metal powder (TMP) is produced in industry by reduction of tungsten oxides, which are obtained by calcination of pure ammonium paratungstate (APT). To this end a technical-grade, i.e. contaminated, sodium tungstate solution obtained from the processing of scrap or ores is generally first purified by means of precipitation processes, then converted to the ammonium salt by solvent extraction (SX), and the resulting ammonium tungstate solutions are crystallised to pure APT by concentration to low volume. The processing constraints are such that highly pure products are necessarily obtained in this way. By acidifying a dispersion of APT with nitric acid, tungstic acid can be obtained, which can in turn be reduced to TMP. Due to the large number of process steps required and in particular because of the need for solvent extraction, the process is complex and correspondingly expensive. For a number of applications of APT or TMP in the hard metal/soft metal sector, the product purity that is obtained is not necessary.

A further disadvantage of the operation described is that the tungstic acids prepared from dispersion display an irregularly shaped, flocculent morphology and hence very low bulk densities of around 0.5 g/cm$^3$. This makes handling and further processing, to TMP for example, more difficult. Spheroidally agglomerated tungstic acid has not previously been known.

EP 0 219 787 B1 discloses a process for the purification of alkaline or ammonium tungstate and/or molybdate solutions by electrodialysis. The alkaline solution is acidified by addition of pure tungstic acid. The tungstic acid that is precipitated at the anode side is separated from the sodium hydroxide solution formed on the cathode side by the membrane that is used, and the sodium hydroxide solution can therefore be reused to disintegrate the tungsten raw material. This route does not allow spheroidally agglomerated tungstic acids having a high bulk density to be obtained, however.

DD 148 522 describes a complex process for producing well-sedimenting tungstic acid from tungsten-containing scrap. To this end, after the generally conventional oxidative alkaline scrap disintegration, followed by purification of the alkaline tungstate solution obtained and precipitation of this alkaline solution with calcium chloride, an artificial scheelite is produced, which initially undergoes particle coarsening by means of high-temperature treatment and then after subsequent regrinding is converted into the well-sedimenting tungstic acid described by addition of hydrochloric acid. The necessary high-temperature treatment in particular means that this process is uneconomical. Although the tungstic acid that can be obtained has satisfactory sedimentation characteristics, it is not spheroidally agglomerated and displays only a low bulk density, and so it is not suitable as a preliminary substance for an economic production of tungsten metal powder.

The object of this invention is to provide tungstic acid having a suitable morphology and purity, which can advantageously be used as an inexpensive raw material for the reduction to tungsten metal powders of various qualities, and a cost-effective process for the production of this tungstic acid.

The object is achieved by reacting tungstate solutions with mineral acids at elevated temperature.

The invention therefore provides a process for the production of a powdered tungstic acid by acidifying an aqueous alkaline tungstate solution, wherein the alkaline tungstate solution is reacted with a mineral acid at a temperature of 50 to 103° C.

A tungstic acid produced by the process according to the invention is characterised by a spherical morphology and hence good filtration and washing properties and, after drying, by high bulk densities and excellent flow characteristics. On the basis of these properties this tungstic acid is ideally suited to the production of tungsten metal powder.

A BRIEF DESCRIPTION OF THE FIGURES

Figure 2:
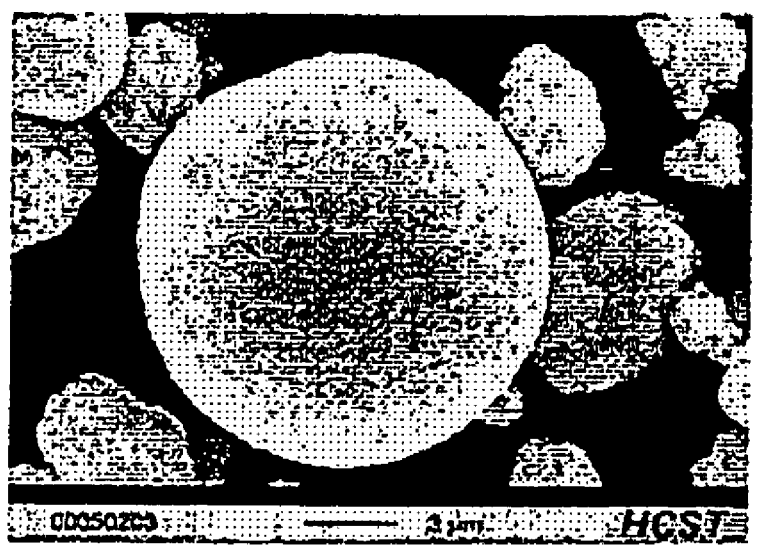

FIGS. 1 and 2 reproduce scanning electron microscopic images of the tungstic acid produced according to example 1 (FIG. 1: 500-times magnification, FIG. 2: 5000-times magnification).

Figure 3:
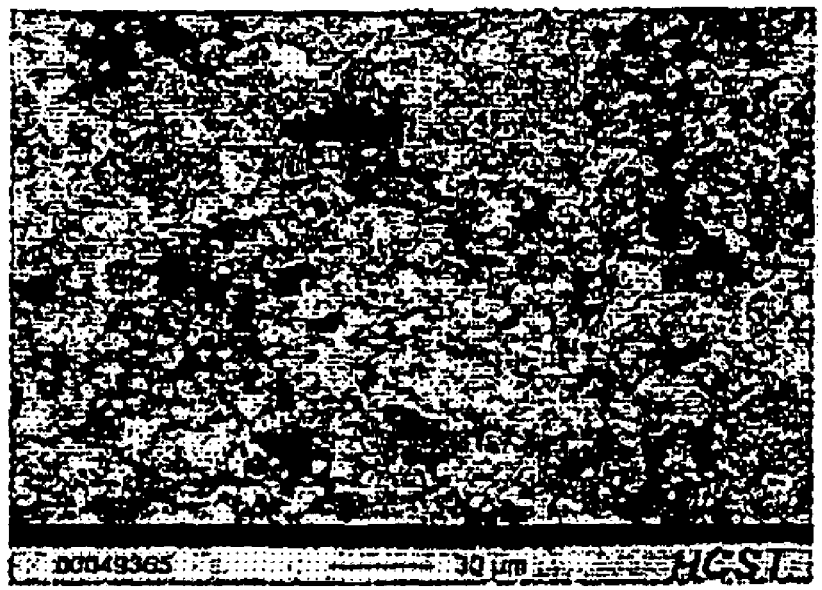
Figure 4:

FIGS. 3 and 4 reproduce scanning electron microscopic images of the tungstic acid produced in the comparative example (FIG. 3: 500-times magnification, FIG. 4: 5000-times magnification).

Examples of suitable mineral acids include sulfuric acid, hydrochloric acid and nitric acid. If nitric acid is used, however, nitrate solutions (mainly ammonium nitrate) are produced as a by-product and have to be disposed of by laborious means, such that sulfuric acid or hydrochloric acid is preferably used, particularly preferably sulfuric acid.

Through the preferred use according to the invention of sulfuric acid or hydrochloric acid, the formation of alkaline or ammonium nitrates is avoided. The mother liquors having excess acid can be fed directly into an acidification stage of the solvent extraction that is often needed in tungsten chemistry, and the washing water can also be combined with the raffinate from a solvent extraction without separate pretreatment.

The precipitation reaction takes place according to the invention at elevated temperature; the temperature is preferably 70 to 100° C, particularly preferably 75 to 95° C.

The process according to the invention can be performed continuously or batchwise.

A continuous mode of operation is preferred. The reaction is preferably performed in a continuous stirred tank or a cascade of at least two continuous stirred tanks. Mineral acid and alkaline tungstate solution are added continuously to the reaction chamber, the tungstic acid that is formed being continuously drawn off.

The preferred stirring rate is dependent on the reactor volume. 800 to 1200 revolutions per minute (rpm) can be cited by way of example as a suitable stirring rate. The continuous stirred tanks preferably have flow spoilers on the inner wall. This makes the mixing of the reactants more intensive and increases the energy input.

If a cascade of stirred tanks is used, the mineral acid and part of the alkaline tungstate solution are preferably metered into the first stirred tank, whilst the remaining part of alkaline tungstate solution is only metered into the second or subsequent stirred tank. In this case the total amount of alkaline tungstate solution to be reacted is preferably divided into equal parts, such that the same amount of alkaline tungstate solution is added to each stirred tank.

Any aqueous solution of the tungstate of any alkali metal can be used as the alkaline tungstate solution. Ammonium tungstate can also be used. However, sodium tungstate solution, in particular technical sodium tungstate solution, is preferably used. The purity of the alkaline tungstate solution can be chosen according to the purity requirements for the end product.

The concentration of tungsten in the alkaline tungstate solution that is used is preferably 150 to 300 g/l, particularly preferably 200 to 250 g/l. More concentrated solutions, for example an autoclave alkaline solution having a $WO_3$ content of approximately 250 to 350 g/l, can also be used, however. This allows the reaction according to the invention to be performed in comparatively small reactors.

The mineral acid is preferably used in concentrated form. If sulfuric acid is used, it is preferably used as an aqueous sulfuric acid having a sulfuric acid concentration of 50 to 70 wt. %, preferably 55 to 60 wt. %.

Reaction of the alkaline tungstate solution with the mineral acid is preferably performed at a molar ratio of mineral acid to tungsten of 12:1 to 2:1, particularly preferably at a molar ratio of mineral acid to tungsten of 9:1 to 4:1.

The volumetric flow rates of mineral acid and alkaline tungstate solution are preferably adjusted such that the ratio of the volumetric flow rate of mineral acid to the overall volumetric flow rate of alkaline tungstate solution is 1:0.5 to 1:2, preferably 1:0.9 to 1:1.2.

A suitable choice of volumetric flow rates and concentrations of the solutions used ensures that the desired pH is established.

The absolute volumetric flow rate of mineral acid and alkaline tungstate solution with an overall reaction chamber volume of around 4 liters is preferably 500 to 1000 ml/h, such that a residence time of the reaction components in the reaction chamber of 4 to 8 hours is obtained. This residence time is preferably adjusted independently of the chosen reactor volume, with a residence time of 4 to 6 hours being particularly preferred.

The tungstic acid precipitated out of the reaction solution can be separated off by filtration, and is generally then washed and dried.

The tungstic acid can be washed with deionised water. The alkali content of the tungstic acid can be reduced by washing with dilute mineral acid. If tungstic acid having a very low alkali content is to be obtained, washing with dilute mineral acid, particularly dilute sulfuric acid, is preferred, wherein this can be followed in turn by washing with deionised water.

Drying is preferably performed at a temperature of 50 to 150° C., particularly preferably 70 to 110° C. The drying time is preferably 1 to 100 h, particularly preferably 10 to 30 h.

The process according to the invention allows the production of tungstic acid having a high bulk density and good flow properties.

The tungstic acid obtainable according to the invention is also characterised by a spherical morphology, i.e. the primary particles are spherical or are congregated to form spherical agglomerates.

The special morphology and the high bulk density make the powders easy to handle. Thus they display good filtration properties and in the dry state generally have good flow properties. They can be reacted to form tungsten metal powder by reduction, wherein the special properties of the tungstic acid significantly increase the cost effectiveness of the reduction process.

The invention therefore also provides tungstic acid powders that display a bulk density in accordance with ASTM B 329 of at least 1.5 g/cm$^3$, preferably at least 1.9 g/cm$^3$, particularly preferably at least 2.0 g/cm$^3$.

The average particle diameter $D_{50}$, determined using a MasterSizer in accordance with ASTM B 822, is preferably 3 to 80 µm, particularly preferably 5 to 30 µm.

The content of alkali metal remaining in the tungstic acid can be controlled by washing with tungstic acid. The tungstic acid according to the invention preferably displays a content of alkaline impurities of <0.5 wt. %, particularly preferably <0.15 wt. %.

The particles of the tungstic acid powders according to the invention preferably display a spherical morphology.

Such tungstic acid powders are obtainable by the process according to the invention.

Imaging methods are used to determine the morphology of the tungstic acid powders. Using a scanning electron microscope with 200-times magnification, a two-dimensional image of a powder sample is obtained. To this end the powder is applied to a square support having an adhesive surface. A visual range is examined in which at least 200 particles are visible. The powder particles visible in this image are assessed. To this end a circle is drawn around one of the imaged powder particles which touches the two points on the particle circumference that are furthest distance apart. A further circle having the same centre is then drawn around the two points on the particle circumference that are the closest distance together. The ratio of the diameter of these two circles is used as a describing criterion for the morphology of the tungstic acid powder. A perfectly spherical powder particle displays a ratio of 1, since all points on the surface of the powder particle are the same distance from the centre of the particle.

Spherical tungstic acid powders, i.e. tungstic acid powders whose powder particles are approximately spherical in shape, are understood to be powders in which at least 95% of the powder particles display a ratio of diameter of the larger circle to diameter of the smaller circle of 1.0 to 1.4.

If the tungstic acid is precipitated by the addition of sulfuric acid, the tungstic acid according to the invention has comparatively high sulfate contents of around 6000 ppm. These contents do not prove to be disruptive in the production of tungsten metal powder, however. In a reduction of tungstic acid, the sulfur is completely converted to $H_2S$, which can be separated from the furnace gas as sodium sulfide using a scrubber. By varying the reduction conditions the average particle diameter and the particle size distribution and the content of alkali contamination in the tungsten metal powder can also be adjusted.

The tungstic acid powders according to the invention are ideally suited to the production of tungsten metal powder.

The invention therefore also provides the use of the tungstic acid powders according to the invention for the production of tungsten metal powder.

To this end the tungstic acid powder is reduced in the manner familiar to the person skilled in the art. The reduction is preferably performed in a hydrogen stream.

The invention is illustrated in further detail below by reference to examples, wherein the examples are intended to simplify understanding of the principle according to the invention and should not be understood as a limitation thereof.

EXAMPLES

The tungstic acids produced in the examples below were examined with regard to various chemical and physical properties, as indicated in the examples. Unless otherwise stated, the procedure used was as follows:

The average particle size ($D_{50}$ value) was determined by laser deflection using a MasterSizer Sμ from MALVERN (ASTM B 822) and the bulk density in accordance with ASTM B 329. The percentages given, unless otherwise stated, are percentages by weight.

Example 1

A precipitating apparatus comprising two stirred-tank reactors (reactor 1 and reactor 2) was used for the continuous precipitation of spheroidal tungstic acid, the overflow from reactor 1 being introduced directly into reactor 2 and the overflow from reactor 2 being recovered as a product suspension.

The educt solutions were supplied by means of mass-controlled metering control units, which ensured a constant and reproducible metering of equal masses of the solutions per unit time. In this cascade, comprising two stirred-tank reactors connected in series, tungstic acid was precipitated out by means of the continuous supply of a 58% sulfuric acid and a sodium tungstate solution (W content 234 g/l) with continuous stirring at a temperature of 85° C. The sulfuric acid was supplied at a metering rate of 760 ml/h to reactor 1, the supply of sodium tungstate solution was divided into two equally sized split streams of 380 ml/h to reactor 1 and 380 ml/h to reactor 2. The stirring rate in both reactors was 1000 rpm. Since the volume of each reactor was 3.9 l, the specified metered amounts resulted in a residence time of around 5 h. 1450 ml of tungstic acid suspension containing 240 g of tungstic acid were obtained per hour.

After a flush time of 5 residence times, the product suspension was collected and processed once a day by suction filtration and washing with 13 l of deionised water. heated to a temperature of 80° C. After drying for 24 hours at 100° C. in a circulating air drying oven, 5760 g of tungstic acid were obtained with the following properties.
W: 73.35%
Na: 0.13%
Sulfate: 6080 ppm
$D_{50}$: 11.84 μm
Bulk density: 2.1 g/cm³
Pycnometric density: 5.38 g/cm³
Loss on drying up to 450° C. (thermogravimetry): 7.8%

FIGS. 1 and 2 reproduce scanning electron microscopic images of the tungstic acid produced in this way (FIG. 1: 500-times magnification, FIG. 2: 5000-times magnification). It can clearly be seen that the individual powder particles display a spherical morphology.

Comparative Example

The precipitation temperature chosen for this example was 20° C.; all other parameters were identical to Example 1 according to the invention. The tungstic acid thus obtained could be filtered only with difficulty and was markedly more bulky than the product obtained according to Example 1.

FIGS. 3 and 4 reproduce scanning electron microscopic images of the tungstic acid produced in this way (FIG. 3: 500-times magnification, FIG. 4: 5000-times magnification). It can clearly be seen that the tungstic acid displays a flocculent rather than a spherical morphology.

Example 2

The procedure according to Example 1 was followed, except that the product separated off from the mother liquor was washed not with deionised water at a temperature of 80° C. but with a dilute sulfuric acid (7 ml conc. $H_2SO_4$ in 1 l deionised water) at a temperature of 80° C. The Na content of the spheroidal tungstic acid obtained in this way was only 233 ppm.

Example 3

A tungstic acid was precipitated under the conditions specified in Example 1, except that the reaction was performed in a single reactor rather than in a cascade of two reactors. The dividing of the sodium tungstate solution as in Example 1 necessarily had to be omitted here, and in addition the metered amounts were adjusted so that the residence time in the single reactor was the same as the overall residence time in reactors 1 and 2 from Example 1. A spheroidal product was obtained in this case too. The $D_{50}$ value was 10.37 μm.

The invention claimed is:

1. A process for the production of a powdered tungstic acid having a spherical morphology which comprises reacting an aqueous alkaline tungstate solution with a mineral acid at a temperature of 50 to 103° C., wherein the reaction is performed continuously in a continuous stirred tank or a cascade of at least two continuous stirred tanks and wherein the reaction of the alkaline tungstate solution with the mineral acid is performed at a molar ratio of mineral acid to tungsten of 9:1 to 4:1 and wherein at least 95% of the powder particles display a ratio of diameter of a larger circle to diameter of a smaller circle of 1.0 to 1.4.

2. The process according to claim 1, wherein the reaction takes place at a temperature of 70 to 100° C.

3. The process according to claim 1, wherein the alkaline tungstate solution is an aqueous sodium tungstate solution.

4. The process according to claim 1, wherein the mineral acid is an aqueous sulfuric acid having a content of $H_2SO_4$ of 50 to 70 wt. %.

5. The process according to claim 1, wherein the residence time in the reaction chamber is 4 to 6 h.

6. The process according to claim 2, wherein the alkaline tungstate solution is an aqueous sodium tungstate solution.

7. The process according to claim 6, wherein the mineral acid is an aqueous sulfuric acid having a content of $H_2SO_4$ of 50 to 70 wt. %.

8. The process according to claim 7, wherein the residence time in the reaction chamber is 4 to 6 h.

9. The process according to claim 1, which consists essentially of reacting an aqueous alkaline tungstate solution with a mineral acid at a temperature of 50 to 103° C., wherein the reaction is performed continuously in a continuous stirred tank or a cascade of at least two continuous stirred tanks.

10. The process according to claim 1, which consists of reacting an aqueous alkaline tungstate solution with a mineral acid at a temperature of 50 to 103° C., wherein the reaction is performed continuously in a continuous stirred tank or a cascade of at least two continuous stirred tanks.

11. The process according to claim 1, wherein the reaction takes place at a temperature of 75 to 100° C.

12. The process according to claim 8, wherein the reaction takes place at a temperature of 75 to 95° C.

* * * * *